United States Patent
Sawyer et al.

(10) Patent No.: US 9,558,356 B2
(45) Date of Patent: *Jan. 31, 2017

(54) DATA DRIVEN SYSTEM FOR RESPONDING TO SECURITY VULNERABILITY

(71) Applicant: ADOBE SYSTEMS INCORPORATED, San Jose, CA (US)

(72) Inventors: David G. Sawyer, San Jose, CA (US); Priyank Choudhury, Delhi (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/923,070

(22) Filed: Oct. 26, 2015

(65) Prior Publication Data
US 2016/0063257 A1    Mar. 3, 2016

Related U.S. Application Data

(63) Continuation of application No. 12/100,542, filed on Apr. 10, 2008, now Pat. No. 9,189,628.

(51) Int. Cl.
*G06F 21/57*  (2013.01)
*G06F 21/55*  (2013.01)
(Continued)

(52) U.S. Cl.
CPC ....... *G06F 21/577* (2013.01); *G06F 17/30091* (2013.01); *G06F 21/554* (2013.01);
(Continued)

(58) Field of Classification Search
CPC .... H04L 63/1441; H04L 63/10; H04L 63/168; G06F 21/554; G06F 21/6218; G06F 21/577; G06F 21/563
See application file for complete search history.

(56) References Cited

U.S. PATENT DOCUMENTS 7,178,166 B1 * 2/2007 Taylor ................... G06F 21/577
                                                     709/228
7,278,168 B1    10/2007 Chaudhury et al.
(Continued)

OTHER PUBLICATIONS

Gehani, Ashish, Surendar Chandra, and Gershon Kedem. "Augmenting storage with an intrusion response primitive to ensure the security of critical data." Proceedings of the 2006 ACM Symposium on Information, computer and communications security. ACM, 2006: (pp. 114-124).*

(Continued)

*Primary Examiner* — Kari Schmidt
(74) *Attorney, Agent, or Firm* — Shook, Hardy & Bacon L.L.P.

(57) ABSTRACT

A data-driven system for fast response to security vulnerability, in one example embodiment, comprises a request detector, a content type evaluator, and a presentation module. A request detector may be configured to detect a request to display content. A content type evaluator may be configured to determine a type of the requested content. A presentation module may be configured to selectively display the requested content based on the determined type of the requested content. The content type evaluator and the presentation module may utilize a data file that stores information related to potential vulnerabilities associated with a content viewing application. Example data file may be an XML file.

20 Claims, 6 Drawing Sheets

(51) Int. Cl.
    *G06F 21/56*     (2013.01)
    *H04L 29/06*     (2006.01)
    *G06F 17/30*     (2006.01)
    *G06F 21/62*     (2013.01)

(52) U.S. Cl.
    CPC ........ *G06F 21/563* (2013.01); *G06F 21/6218* (2013.01); *H04L 63/10* (2013.01); *H04L 63/1441* (2013.01); *H04L 63/168* (2013.01); *G06F 2221/033* (2013.01)

(56) References Cited

U.S. PATENT DOCUMENTS

| | | | |
|---|---|---|---|
| 7,562,293 B2 | 7/2009 | Marcy et al. | |
| 7,607,172 B2 | 10/2009 | Zurko et al. | |
| 7,698,559 B1 | 4/2010 | Chaudhury et al. | |
| 8,695,096 B1 | 4/2014 | Zhang | |
| 2002/0156650 A1* | 10/2002 | Klein | G06F 19/322 705/2 |
| 2005/0234856 A1* | 10/2005 | Baumhof | G06F 17/2247 |
| 2006/0198692 A1 | 9/2006 | Petit | |
| 2006/0242166 A1 | 10/2006 | Larcheveque et al. | |
| 2006/0242709 A1 | 10/2006 | Seinfeld et al. | |
| 2006/0271835 A1 | 11/2006 | Marcy et al. | |
| 2007/0150741 A1* | 6/2007 | Kaler | G06F 21/445 713/182 |
| 2008/0109871 A1 | 5/2008 | Jacobs | |
| 2008/0178302 A1 | 7/2008 | Brock et al. | |
| 2008/0184105 A1 | 7/2008 | Marcy et al. | |
| 2008/0263358 A1 | 10/2008 | Alme | |
| 2011/0093954 A1* | 4/2011 | Lee | G06F 21/577 726/25 |
| 2011/0239294 A1 | 9/2011 | Kim et al. | |
| 2015/0271199 A1* | 9/2015 | Bradley | H04L 63/1441 726/25 |

OTHER PUBLICATIONS

S. Srinivasan, "Security and Privacy in the Computer Forensics Context," 2006 International Conference on Communication Technology, Guilin, 2006, pp. 1-3.*

Huang, Yao-Wen, et al. "Web Application Security Assessment by Fault Injection and Behavior Monitoring." Proceedings of the 12th International Conference on World Wide Web. ACM, 2003: (pp. 148-159).

Huang, Yao-Wen, et al. "Non-Detrimental Web Application Security Scanning." Software Reliability Engineering, 2004. ISSRE 2004. 15th International Symposium on. IEEE, 2004: (pp. 219-230).

Reis, Charles, et al., "BrowserShield: Vulnerability-Driven Filtering of Dynamic HTML", Microsoft Research- OSDI, (2006), 14 pgs.

Non-Final Office Action dated Dec. 21, 2010 in U.S. Appl. No. 12/100,542, 14 pages.

Final Office Action dated May 31, 2011 in U.S. Appl. No. 12/100,542, 14 pages.

Notice of Allowance dated Jun. 22, 2015 in U.S. Appl. No. 12/100,542, 14 pages.

* cited by examiner

```
<?xml version="1.0" encoding="utf-8"?>
<product="Acrobat" version_min="7.0" version_max="9.0">
 <disabled>
   <annot
     style = "link"
     subtype ="mailto">
   </annot>
 </disabled>

<disabled>
   <mediatype="flash">
      <content type="bytestream">
           0x34 0x45 0x67
      </content>
   </mediatype>
 <disabled>

</product>
```

DATA DRIVEN SYSTEM FOR RESPONDING TO SECURITY VULNERABILITY

TECHNICAL FIELD

This disclosure relates generally to the technical fields of software and/or hardware technology and, in one example embodiment, to system and method for responding to security vulnerability.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer system may be a subject of attacks by intruders who utilize malicious computer code downloaded onto the system in order to jeopardize or corrupt data or applications resident on a computer system, or to otherwise compromise the integrity of the system. Both network and stand alone computer systems may be subject to such intrusion. The intrusion typically is the result of malicious code gaining access to and changing the content of a portion of the computer system's visual control software. Some existing solutions addressing security of a computer system include virus checkers, security risk evaluators, etc. For example, computer users fight against viruses by applying a security patch to the computer's operating system and applications, updating the current virus definition file, and executing a virus check. In particular, as a countermeasure against a new strain of virus, users need to update the current virus definition file and execute a virus check immediately after notified of a new virus definition file being available.

BRIEF DESCRIPTION OF DRAWINGS

Embodiments are illustrated by way of example and not limitation in the figures of the accompanying drawings, in which like references indicate similar elements and in which:

FIG. 5 is a diagrammatic representation of a security data file, in accordance with an example embodiment.

DETAILED DESCRIPTION

Figure 1:
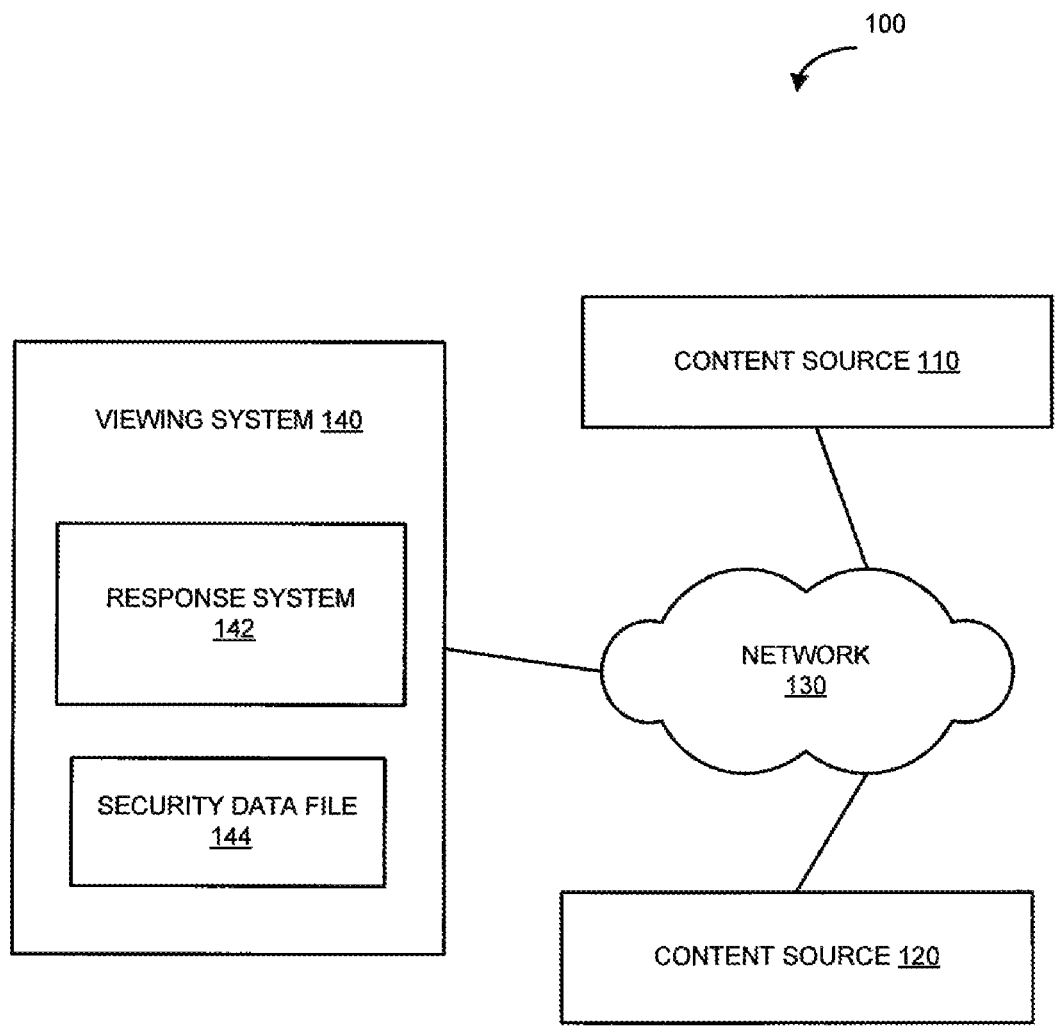
FIG. 1 is a block diagram showing a network environment within which a method and system for responding to security vulnerability, in accordance with an example embodiment.

A data-driven system for fast response to security vulnerability is described. Systems used to view complex, compound formats may be vulnerable to security threats. For example, an electronic document or a web page may contain text, images, multi-media, scripts, or even raw binary data that is handled by a third party application. With so many different types of data and program code to display that data, it becomes difficult to quickly respond to a known security threat. When a security threat is identified, the program code associated with potentially harmful data must be fixed and tested. The process of correcting and testing the program code may take a considerable amount of time and may require engaging a third party's efforts. A security problem may be discovered at a time when an attack is already underway and there is little or no time available to diagnose, develop, and deploy a patch to the program code. A mechanism is described to disable program functionality that may be associated with a security hole, which may permit sufficient time to develop a proper fix.

In one example embodiment, each type of content element may be associated with a unique code. Those unique codes that correspond to content types associated with a security threat or vulnerability may be included in a so-called security data file. The security data file may be provided with a viewing application and may be consulted whenever the application is being launched or a request to process content is being detected. The techniques described herein may be used advantageously to address a newly discovered vulnerability in a content viewing application and to help protect a user's system from security threats such as, e.g., a virus attack.

An application such as a web browser or a document viewing system (collectively referred to as a viewing application or a target viewing application) may be configured to use a security data file to determine if certain content elements in a data source are known to be associated with a possible security hole. A data source may be, e.g., an electronic document, a web page, etc. A security data file, in one example embodiment, may be an eXtensible Markup Language (XML) file. If the target viewing application determines, by consulting the associated security data file, that a data source that is directed at the viewing application includes a content element of a certain type, the viewing application may block just that content element from being processed but allow the processing of the other content elements from the data source. In one example embodiment, the viewing application may disable one of its own components or features if the component is associated with an entry in the security data file. These elements may remain disabled until a solution or patch to the security hole is developed.

A security data file may be updated, e.g., in response to a spreading virus or in response to a newly discovered vulnerability associated with a type of content or with a viewer application. For example, if it is determined that a particular visual control in a viewer application (e.g., a button that invokes a link to a web site) may be associated with a certain vulnerability because it may open a communications channel that is potentially prone to security threats, the security data file may be updated to include an entry indicating that this particular visual control is to be disabled when the viewer application is launched or in response to detecting a request to invoke certain functionality of the visual control. In one embodiment a visual control that is determined to be subject to security vulnerability may be grayed-out or not displayed by the user interface (UI) module of the viewing application.

Thus, in one example embodiment, a data-driven system for fast response to security vulnerability allows selective disabling of one or more features in a viewing application, rather than blocking the whole content. For example, when FIREFOX® browser is determined to have a vulnerability in its FLASH® plug-in, the data-driven system for fast response to security vulnerability may be used to block only the FLASH® content that may try to take advantage of the discovered vulnerability. Thus, access to web sites that do not use FLASH® maliciously may still be permitted by the viewing application. Moreover even for sites that do take advantage of the vulnerability, only the FLASH® content from those sites will be blocked; the rest of the content, e.g., hyper text markup language (HTML) content, cascading style sheets (CSS), etc. may still be permitted and work properly.

A data-driven system for fast response to security vulnerability, in one example embodiment, may thus be used to selectively disable a feature in a product that has already been shipped. For example, a viewing application may be configured to disable a printing button merely by updating the security data file. In operation, the security data file may be parsed in response to a user's request to launch the viewing application and, based on the entries in the security data file, the viewing application may be launched with some of its features disabled. An approach that provides content filtering functionality that is integrated with or is part of a viewer application (e.g., in the form of a plug-in) may provide a quick way to turn off program functionality without altering the program code. As mentioned above, a data-driven system for fast response to security vulnerability may be beneficial where the program code of an application that may not be readily available for patching.

In operation, according to one example embodiment, when a viewing application, such as, for example, a web browser or a document viewer is about to display content, the type of content is determined and checked against a list of known vulnerable content types provided via a security data file. If the type of the content matches any of the entries in the security data file, the content is not processed by the viewing application. In a typical situation, where an application does not have any identified security vulnerabilities, the list in the security data file is empty. When, however, a security vulnerability becomes known or an attack in progress is discovered, the list may be updated to contain information identifying vulnerable content type. When the vulnerability is eliminated, e.g., by providing a patch to the application, the list in the data file can be emptied again. Alternatively, the security file may use version numbers to indicate which versions of the program (e.g., a viewing application) are vulnerable. Thus, when a patched version of the program is released with a new version number, the security file can remain unchanged.

The security data file may be consulted also in response to a request associated with a content element. For example, the content to be displayed by the viewing application may include various types of content, including, e.g., a progressive scan Joint Photographic Experts Group (JPEG) element. If the security data file lists a progressive scan JPEG, this element would not be processed by the viewing application, while other elements of the content would be processed and displayed. In a different scenario, the content to be displayed by the viewing application may include a non-progressive scan JPEG element. If the security data file lists a progressive scan JPEG, but not a non progressive scan JPEG, the non-progressive scan JPEG element would be processed and displayed by the viewing application. In some embodiments, the method and system for responding to security vulnerability may be invoked in response to an action (e.g., a cross-domain call) performed by a plug-in that is running within the viewing application. Example data-driven system for fast response to security vulnerability may be described with reference to a network environment illustrated in FIG. 1.

FIG. 1 shows an example network environment 100, within which a data-driven system for fast response to security vulnerability (or merely response system) may be implemented. The network environment 100 may include a plurality of content sources—a content source 110 and a content source 120—and a viewing system 140. The content sources 110, 120, and the viewing system 140 may be in communication with each other via a network 130. The communications network 130 may be a public network (e.g., the Internet, a wireless network, a public switched telephone network (PSTN), etc.) or a private network (e.g., LAN, WAN, Intranet, etc.).

As shown in FIG. 1, the viewing system 140 includes a response system 142 and a security data file 144. The security data file 144, in one example embodiment, is downloaded to the viewing system 140 (e.g., from a server system—not shown), whenever there has been a change to the entries in the security data file maintained by the server system. If there is no online connection with the server system present, the viewing system 140 waits until the connection is restored. The viewing system 140 may be configured to check for updates on idle when the viewing system 140 is being used. In one example embodiment, the viewing system 140 checks for updates that may be available for the security data file 144 shortly after it is being launched.

The response system 142, in one example embodiment, is configured to detect requests from the content sources 110 and 120. A request detected by the response system 142 may include a request from the content source 110 to display, e.g., a web page or an electronic document in a portable document format (PDF). The response system 142 may detect such a request, examine the content elements associated with the request to determine respective types of the content elements. As mentioned above, different content types may be associated with respective unique codes. The codes of potentially undesirable content types may be listed in the security data file 144. The response system 142 may compare the codes of the content elements associated with the request. If a code of a content element associated with the request is detected in the security data file, the response system 142 blocks the processing of that content element. The operation of blocking the content element may include preventing the display of the content element, e.g., by disabling an associated feature of the viewing system 140. In some embodiments, the operation of blocking the content element may include preventing the viewing system from fetching the content element from the content source 110. An example response system may be discussed with reference to FIG. 2.

Figure 2:
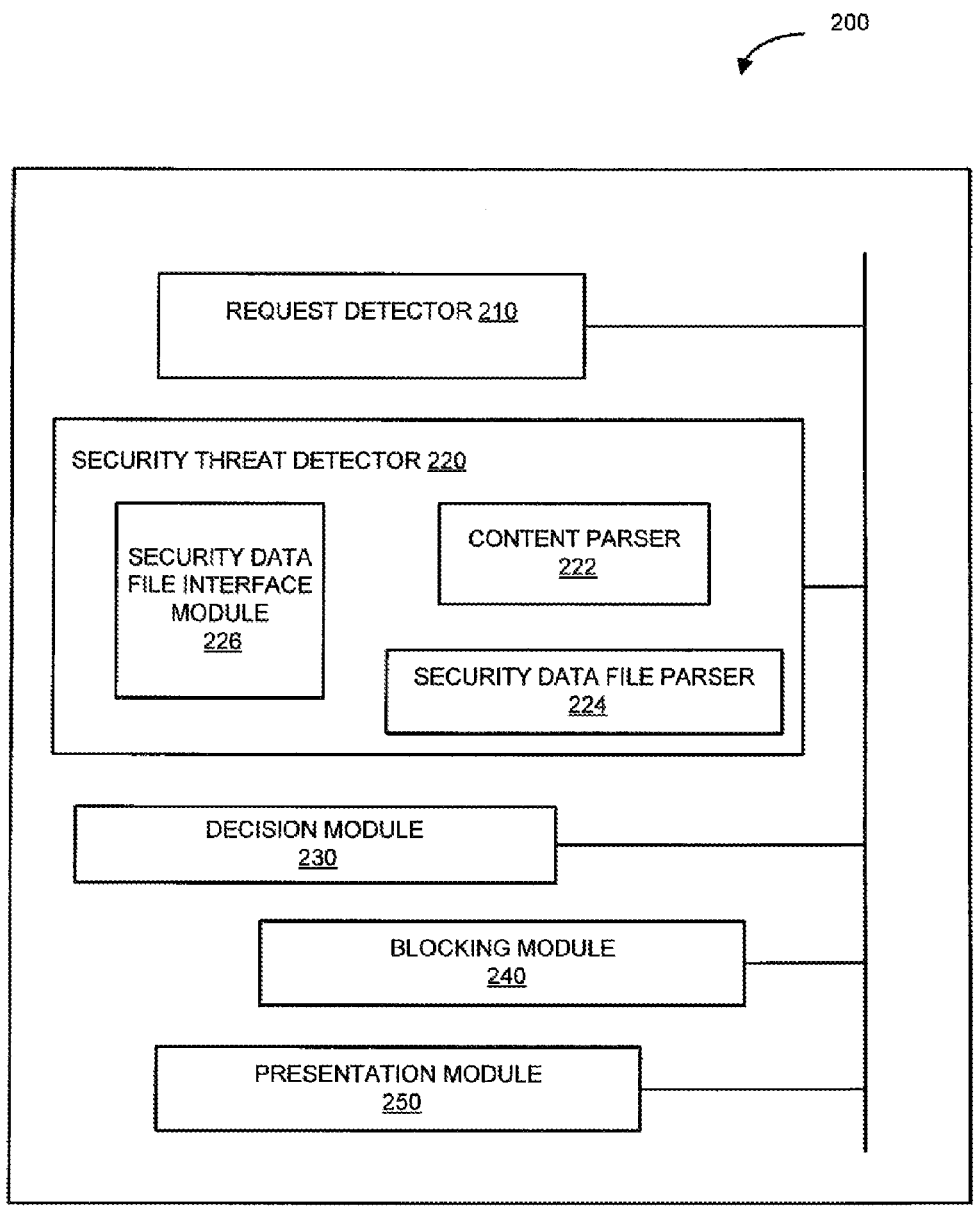
FIG. 2 is a block diagram illustrating a response system, in accordance with an example embodiment.

FIG. 2 shows a block diagram illustrating a response system 200, according to one example embodiment. As shown in FIG. 2, the response system 200 includes a request detector 210, a security threat detector 220, a decision module 230, a blocking module 240, and a presentation module 250. The request detector 210 may be configured to detect a request associated with a content element, e.g., a request from the content source 120 of FIG. 1 to display content that includes the content element, e.g., a JPEG image. The security threat detector 220 may be configured to determine whether the content element is associated with a security vulnerability. The security threat detector 220 may include modules to parse the content that is the subject of the request (utilizing a content parser 222), to access the security data file 144 of FIG. 1 (utilizing a security data file interface module 226), and to determine (utilizing a security data file parser 224) whether the security data file 144 includes an indication that the content that is the subject of the request (subject content) includes one or more codes associated with the content elements from the subject content. It will be noted that, in some embodiments, the content parser 222, the security data file parser 224, and the security data file interface module 226 may be implemented as separate modules that are part of the security threat detector 220. In other embodiments, the content parser 222, the security data file parser 224, and the security data file interface module 226 may be implemented as a single module.

The decision module 230 may be configured to determine whether to disallow operations associated with the content element based on a result of the interrogating of the security data file. The decision module 230, in one example embodiment, makes this determination based on a result of the interrogating of the security data file 144 with codes associated with various content elements from the subject content. The blocking module 240 may be configured to disallow operations associated with the content element, e.g., based on the determination by the decision module 230. The presentation module 250 may be configured to determine whether any of the content elements from the subject content is to be prevented from being processed, or blocked, by the viewing system 140 of FIG. 1. The presentation module 250 may be configured to selectively display the content element based on the determination by the decision module 230 of whether to disallow the content element.

The modules of the system 200 may be, in one example embodiment, part of a viewing application. Examples of a viewing application include various web browsers, as well as document viewing applications such as ADOBE® READER® and ADOBE® ACROBAT®. Various operations performed by the response system 200, according to an example embodiment, may be discussed with reference to FIG. 3.

Figure 3:
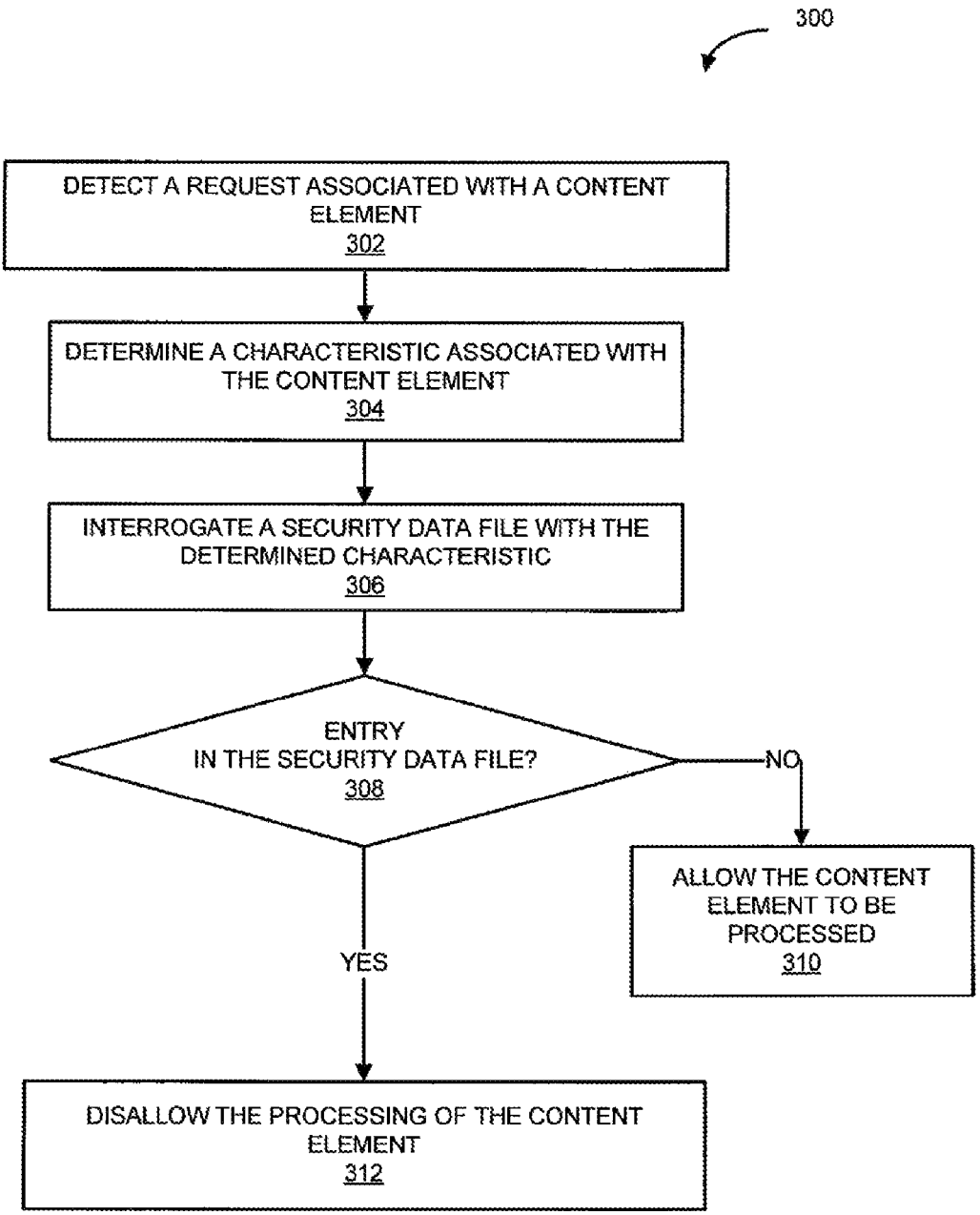
FIG. 3 is a flow chart illustrating a method for responding to security vulnerability by selectively disallowing content, in accordance with an example embodiment.

FIG. 3 is a flow chart illustrating a method 300 for responding to security vulnerability (that may or may not be associated with an existing security attack or a virus) by selectively disallowing operations relating to content, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 2.

As shown in FIG. 3, the method 300 commences with operation 302, where the request detector 210 of FIG. 2 detects a request associated with a content element, the request targeting a viewing application. As mentioned above, the request may be triggered, e.g., by an action that launches the viewing application, by a user requesting content to be displayed by the viewing application, by an action initiated by a plug-in running in the viewing application, etc. At operation 304, the content parser 222 of FIG. 2 determines a characteristic associated with the content element. The determined characteristic may be expressed by a unique code associated with the type of the content element. The security file data parser 224 of FIG. 2 then interrogates a data file (e.g., the security data file 144 of FIG. 1) with the determined characteristic associated with the content element at operation 306. If the security file data parser 224 determines, at operation 308, that the security data file 144 does not have any entries related to the determined characteristic, the content element is allowed to be processed by the viewer application at operation 310. If, however, the security file data parser 224 determines, at operation 308, that the security data file 144 contains an entry related to the determined characteristic (e.g., the code associated with the type of the content element), the blocking module 240 of FIG. 2 prevents the content element from being processed by the viewer application at operation 312.

As mentioned above, in order to block or disallow the processing of a potentially harmful content or of a potentially malicious request, a viewing application may be configured to disable one of its own features or components if there is an indication in the security data file that a particular feature or a component may be vulnerable to a security attach. This approached may be described with reference to FIG. 4.

Figure 4:
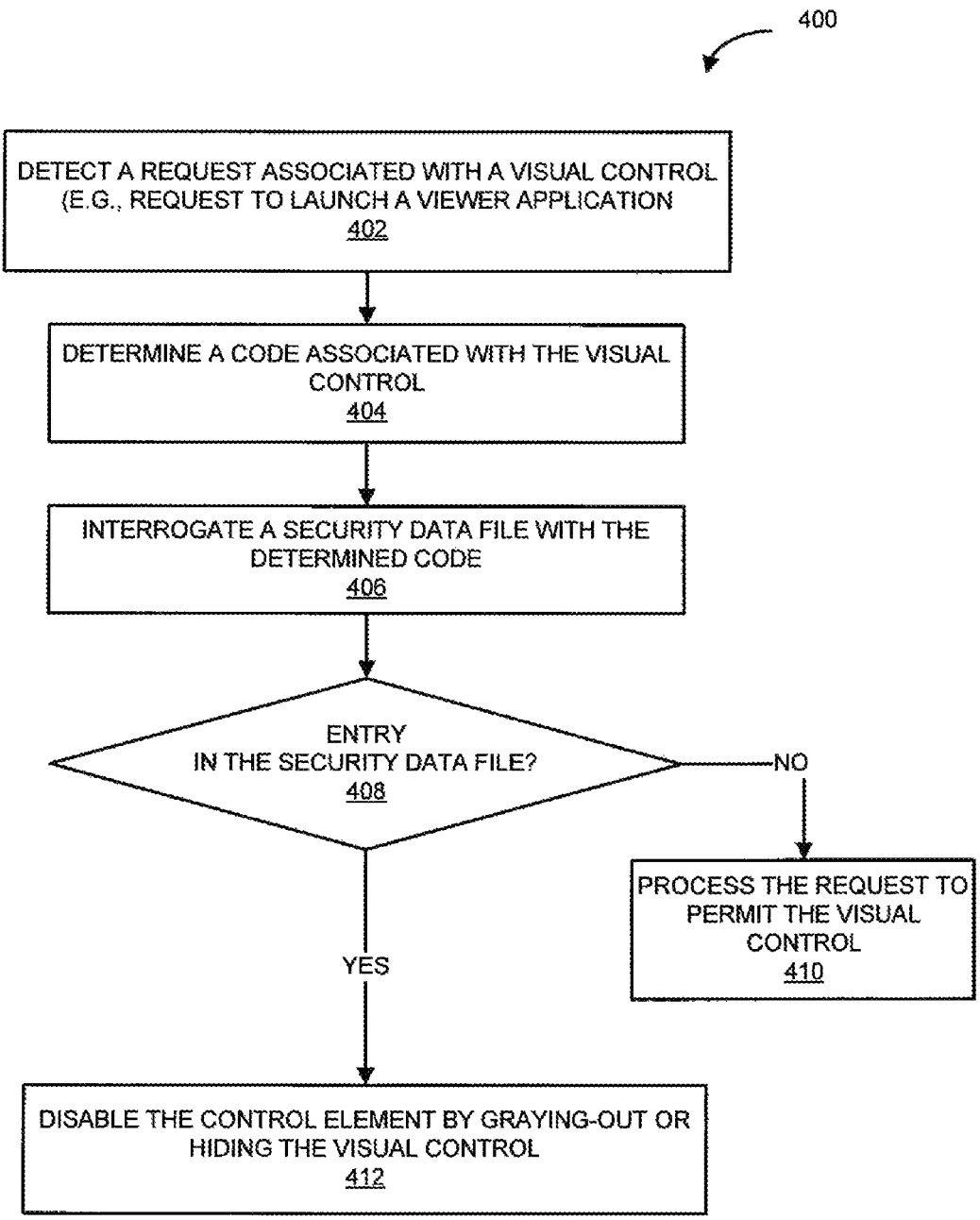
FIG. 4 is a flow chart illustrating a method for responding to security vulnerability by selectively disabling features in a viewing application, in accordance with an example embodiment.

FIG. 4 is a flow chart illustrating a method 400 for responding to security vulnerability by selectively disabling features in a viewing application, in accordance with an example embodiment.

The method 400 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 2.

As shown in FIG. 4, the method 400 commences with operation 402, where the request detector 210 of FIG. 2 detects a request associated with a visual control that is present in a viewing application. Such request may be a request to launch a viewer application, which may require presenting or activating the visual control. At operation 404, the security threat detector 220 of FIG. 2 determines a characteristic associated with the visual control. A characteristic associated with the visual control may be a unique code associated with the type of content elements that are processed by the visual control. The security file data parser 224 of FIG. 2 then interrogates the security data file 144 of FIG. 1 with the characteristic at operation 406. If the security file data parser 224 determines, at operation 408, that the security data file 144 does not have any entries related to the determined characteristic, the visual control is permitted to be displayed or activated by the viewing application at operation 410. If, however, the security file data parser 224 determines, at operation 408, that the security data file 144 contains an entry related to the determined characteristic (e.g., the code associated with the type of content elements that are being processed or accessed by the visual control), the blocking module 240 of FIG. 2 prevents the content element from being processed by the viewer application at operation 412.

FIG. 5 is a diagrammatic representation of a security data file 500, in accordance with an example embodiment. The file security data file 500 is used to disable two features in a viewing application, specifically in ADOBE® ACROBAT®. It will be noted, that a viewing application may be configured to utilize various mechanisms to determine a manner in which to display or process a content element. The example in FIG. 5 illustrates how multiple areas of the product (e.g., ADOBE® ACROBAT®) may be shut down in order to stop potential attacks. The viewing application may decide simply to skip processing of matching types and leave a blank space in the page where the content element was.

Turning to the specific example of the security data file 500, in the first half of the file, annotations of type "link" are disabled. Annotations in some viewing applications may refer to additional content beyond the basic printed page. For this example, a "link" can be thought of as an active area on the page that provides a mechanism to redirect a user to another location. As shown in FIG. 5, only a particular type of annotation, the "link" annotation, is disabled. Other annotations, such as, for example, highlights, sticky notes, callout text, watermarks, etc., are still enabled. Furthermore, of the type "link" annotations, only the subtype "mailto" is disabled. Thus, other types of link annotations, such as, for example, a universal resource locator (URL), a glossary, a goto page annotation, etc., are still enabled when the security data file 500 is used by the viewing application.

In the second half of the security data file 500, media of type FLASH® are disabled. FLASH® is an interactive graphic format from ADOBE® that can be embedded in web pages and documents. In this example, the security data file 500 indicates that only FLASH® content with the bytes 0x34 0x45 0x67 in a row is disabled. This may allow some FLASH® to be displayed while preventing from being processed any content that includes the above-identified pattern. The entries in the security data file 500 that target various security vulnerabilities may be referred to as a vulnerability list.

Figure 6:
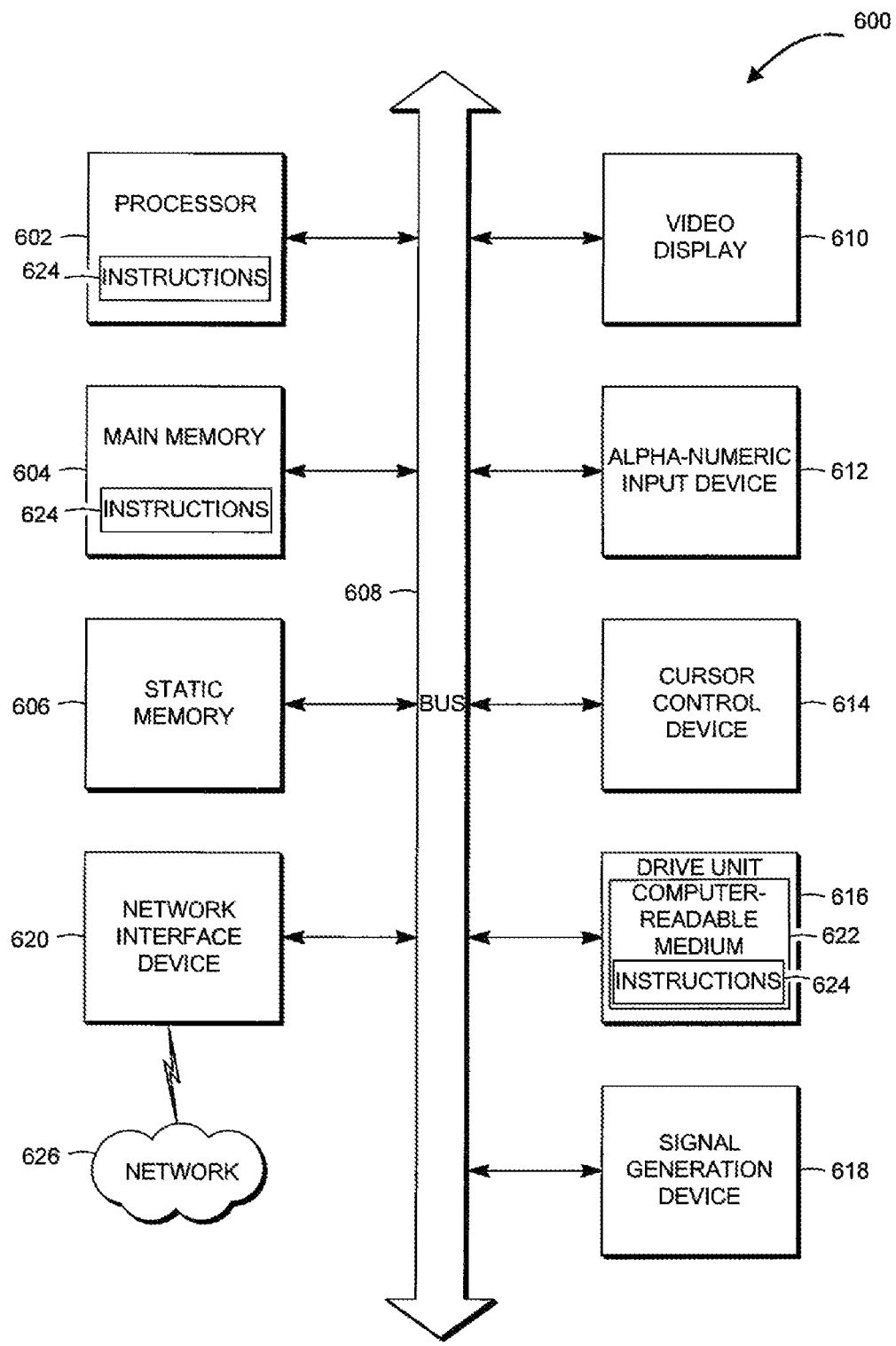
FIG. 6 is a diagrammatic representation of a machine in the example form of a computer system within which a set of instructions, for causing the machine to perform any one or more of the methodologies discussed herein, may be executed.

FIG. 6 is a diagrammatic representation of a machine in the example electronic form of a computer system 600 within which a set of instructions, for causing the machine to perform any one or more of the methodologies discussed herein, may be executed.

In various embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a computer-readable (or machine-readable) medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

Thus, a data-driven system for fast response to security vulnerability has been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system that responds to a security vulnerability associated with a computer-executable viewing application, the system comprising:
   one or more processor devices; and
   one or more memory devices that store instructions, which when executed by the one or more processor devices, perform actions that include:
   employing a request detector to detect a request related to a first content element and a second content element that are included in a data source of the viewing application, wherein the security vulnerability is further associated with the first content element;
   employing a content parser to determine a characteristic of the first content element and a characteristic of the second content element;
   employing a security data file parser to interrogate a security data file with the characteristic of the first content element and the characteristic of the second content element; and
   employing at least a decision module to disallow operations relating to the first content element and to allow operations relating to the second content element based on a result of the interrogating of the security data file, wherein the security data file includes an entry corresponding to the characteristic of the first content element and does not include an entry corresponding to the characteristic of the second content element.

2. The system of claim 1, wherein the request related to the first and the second content elements is a request to launch the viewing application and render each of the first and the second content elements.

3. The system of claim 1, wherein the request related to the first and the second content elements is a request to enable the viewing application to display each of the first and the second content elements.

4. The system of claim 1, each of the request detector, the content parser, and the decision module are operative within the viewing application.

5. The system of claim 1, wherein the actions further include further employing a blocking module to disallow the operations relating to the first content element.

6. The system of claim 5, wherein the blocking module is to disable a control element included in the viewing application and associated with the first content element.

7. The system of claim 6, wherein the control element and the first content element are associated with an electronic document.

8. The system of claim 6, wherein the control element and the first content element are associated with a plug-in.

9. The system of claim 1, wherein the entry corresponding to the characteristic of the first content element and included in the security data file reflects the security vulnerability associated with the first content element.

10. The system of claim 1, wherein the actions further include employing a presentation module to selectively display the second content element and to not display the first content element based on employing at least the decision module disallow the operations relating to the first content element and to allow the operations relating to the second content element.

11. A method for responding to a security vulnerability associated with a computer-executable viewing application, the method comprising:
  detecting, via more processor devices, a request to invoke functionality of the viewing application that is associated with a control element of the viewing application and the security vulnerability;
  determining, via the one or more processor devices, a characteristic of the control element of the viewing application;
  interrogating a security data file via the one or more processor devices and the determined characteristic; and
  determining, via the one or more processor devices, to disable the functionality associated with the control element when the interrogating locates an entry included in the security data file that indicates disabling the functionality.

12. The method of claim 11, the request to invoke the functionality associated with the control element is a request to launch the viewing application and the viewing application processes a content element.

13. The method of claim 11, wherein the functionality associated with the control element includes displaying a content element.

14. The method of claim 11, the request to invoke the functionality associated with the control element includes a request initiated by a plug-in associated with the viewing application and the plug-in processes a content element.

15. The method of claim 11, further comprising:
  in response to the determining to disable the functionality associated with the control element, graying-out a display the control element in a user interface.

16. The method of claim 11, further comprising:
  in response to the determining to disable the functionality associated with the control element, disabling a display of the control element in a user interface.

17. The method of claim 16, wherein the control element is associated with an electronic document.

18. The method of claim 11, wherein the functionality associated with the control element is associated with a plug-in.

19. The method of claim 11, wherein the entry included in the security data file further indicates the security vulnerability associated with the control element.

20. The method of claim 11, wherein the control element includes a cross-domain link in a content element associated with a browser plug-in.

* * * * *